United States Patent
Goodbody

(10) Patent No.: US 10,291,339 B2
(45) Date of Patent: May 14, 2019

(54) EVALUATING NEAR RANGE COMMUNICATIONS QUALITY

(71) Applicant: BAE Systems plc, London (GB)

(72) Inventor: Brendan Christian Goodbody, Chelmsford (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/743,812

(22) PCT Filed: Jun. 28, 2016

(86) PCT No.: PCT/GB2016/051935
§ 371 (c)(1),
(2) Date: Jan. 11, 2018

(87) PCT Pub. No.: WO2017/013385
PCT Pub. Date: Jan. 26, 2017

(65) Prior Publication Data
US 2018/0205471 A1    Jul. 19, 2018

(30) Foreign Application Priority Data

Jul. 22, 2015 (EP) ..................................... 15275176
Jul. 22, 2015 (GB) ..................................... 1512923

(51) Int. Cl.
*H04B 17/00* (2015.01)
*H04B 17/391* (2015.01)
(Continued)

(52) U.S. Cl.
CPC .......... *H04B 17/3913* (2015.01); *H04W 4/80* (2018.02); *H04W 16/20* (2013.01);
(Continued)

(58) Field of Classification Search
CPC .... H04B 17/3913; H04W 4/80; H04W 16/20; H04W 16/22; H04W 24/00; H04W 24/05
(Continued)

(56) References Cited

U.S. PATENT DOCUMENTS 6,442,507 B1 * 8/2002 Skidmore ............... H04L 41/12
342/463
8,131,312 B2 * 3/2012 Levin .................... H04B 17/391
342/174
(Continued)

FOREIGN PATENT DOCUMENTS

| JP | 2012043185 A1 | 3/2012 |
| WO | 02065346 A1 | 8/2002 |
| WO | 2015097481 A1 | 7/2015 |

OTHER PUBLICATIONS

"Algorithms for the reduction of the number of points required to represent a digitized line or its caricature" (Davis Douglas & Thomas Peucker), The Canadian Cartographer 10(2), 112-122 (1973) doi:10.3138/FM57-6770-U75U-7727.
(Continued)

*Primary Examiner* — Sonny Trinh
(74) *Attorney, Agent, or Firm* — Maine Cernota & Rardin

(57) ABSTRACT

A method and system configured to evaluate near range communications quality in an environment. Data describing an environment is obtained from at least one data source (202). The data describing the environment is processed (204) to generate a ground-plane data set (206) describing a ground-plane of the environment, and a 3D object data set (206) describing 3D objects in the environment. These data are used to compute (208) a propagation path between a first location and a second location in the environment, and a near range communications quality characteristic of the propagation path is computed (210).

14 Claims, 10 Drawing Sheets

(51) Int. Cl.
H04W 16/22 (2009.01)
H04W 4/80 (2018.01)
H04W 16/20 (2009.01)
H04W 24/00 (2009.01)
H04W 24/06 (2009.01)

(52) U.S. Cl.
CPC ............ H04W 16/22 (2013.01); *H04W 24/00* (2013.01); *H04W 24/06* (2013.01)

(58) Field of Classification Search
USPC .................. 455/41.1, 41.2, 67.11, 115.1
See application file for complete search history.

(56) References Cited

U.S. PATENT DOCUMENTS

| | | | |
|---|---|---|---|
| 8,995,988 B2* | 3/2015 | Shibayama | H04W 16/18 370/328 |
| 9,612,123 B1* | 4/2017 | Levinson | G01C 21/32 |
| 9,734,455 B2* | 8/2017 | Levinson | G05D 1/0088 |
| 2004/0236547 A1 | 11/2004 | Rappaport et al. | |
| 2007/0271079 A1* | 11/2007 | Oguchi | H04B 17/3912 703/8 |
| 2011/0287801 A1 | 11/2011 | Levin | |
| 2013/0115961 A1 | 5/2013 | Shibayama | |
| 2014/0368501 A1 | 12/2014 | Breton | |
| 2018/0138996 A1* | 5/2018 | Lee | H04B 17/345 |

OTHER PUBLICATIONS

Digital Image Processing Using MATLAB (Gonzalez, R.S., Woods, R.E, Eddins, S.L.) Gatesmark Publishing 2009.
Computer and Robot Vision (Haralick, Robert M., Shapiro, Linda G.) vol. 1, Addison-Wesley 1992 pp. 158-205.
"Methods for Fast Morphological Image Transforms Using Bitmapped Images" (Van Den Boomgard, R., Van Balen, R.) Computer Vison, Graphics, and Image Processing: Graphical Models and Image Processing, vol. 54, No. 3, pp. 254-258, May 1992.
"A Generalization of Dijkstra's Algorithm" Information Processing Letters 6 (1): 1-5. doi 10.1016/0020-0190(77)90002-3, (Feb. 1977).
International Preliminary Report on Patentability of International Application No. PCT/GB2016/051935, dated Feb. 11, 2017, 18 pages.
International Search Report and Written Opinion of International Application No. PCT/GB2016/051935, dated Sep. 6, 2016, 14 pages.
Extended European Search Report of European Application No. EP15275176.4, dated Jan. 18, 2016, 10 pages.
Search Report under Section 17(5) of Great Britain Application No. GB1512923.2, dated Feb. 15, 2016, 4 pages.
Tameh, E K and Nix A R, "The use of measurement data to analyse the performance of rooftop diffraction and foliage loss algorithms in a 3-D integrated urban/rural propagation model", Proc of VTC '98 (48th IEEE Vehicular Technology conference), vol. 1, pp. 303-307, May 18-21, 1998.

* cited by examiner

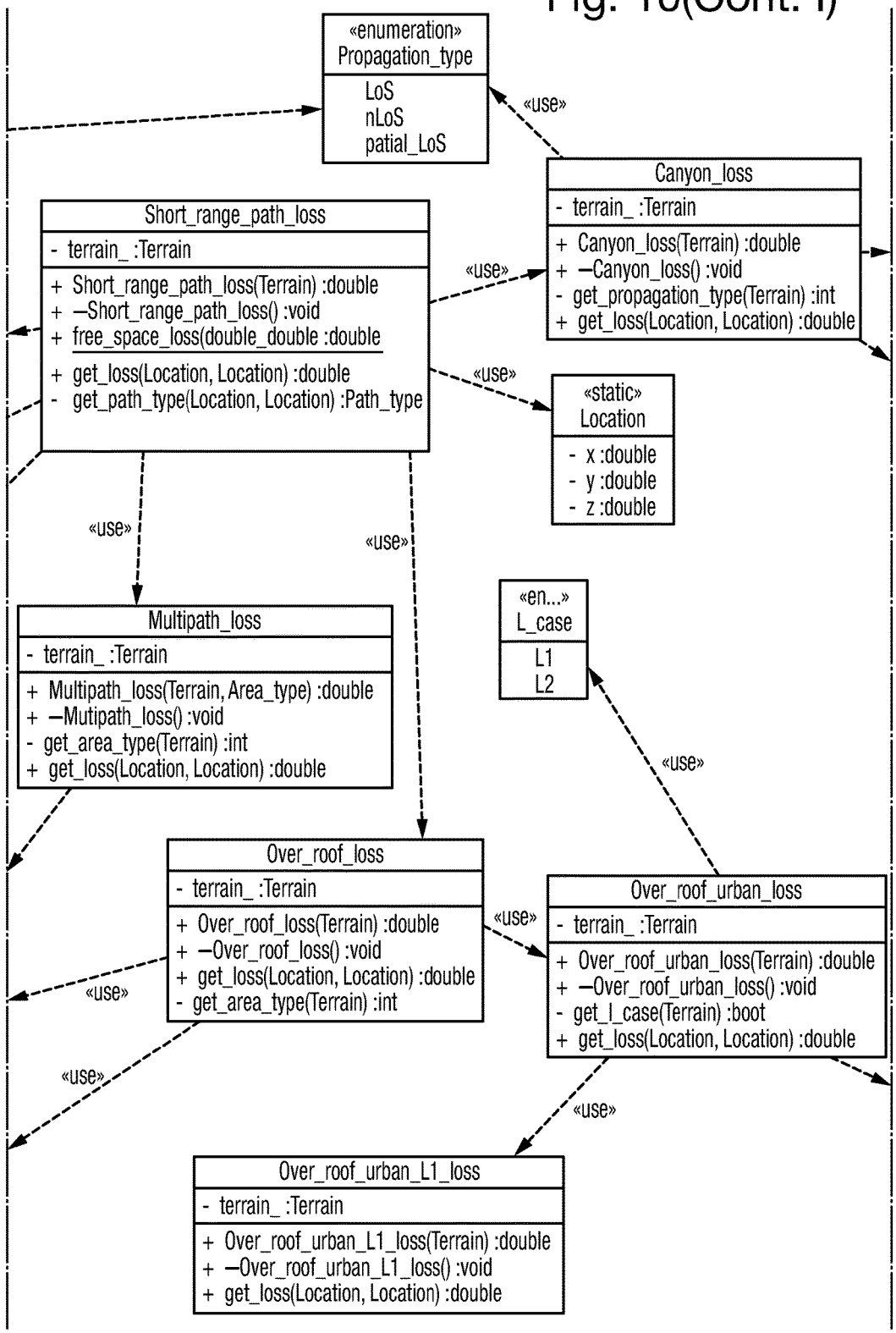
Fig. 10(Cont. I)

Fig. 10(Cont. II)
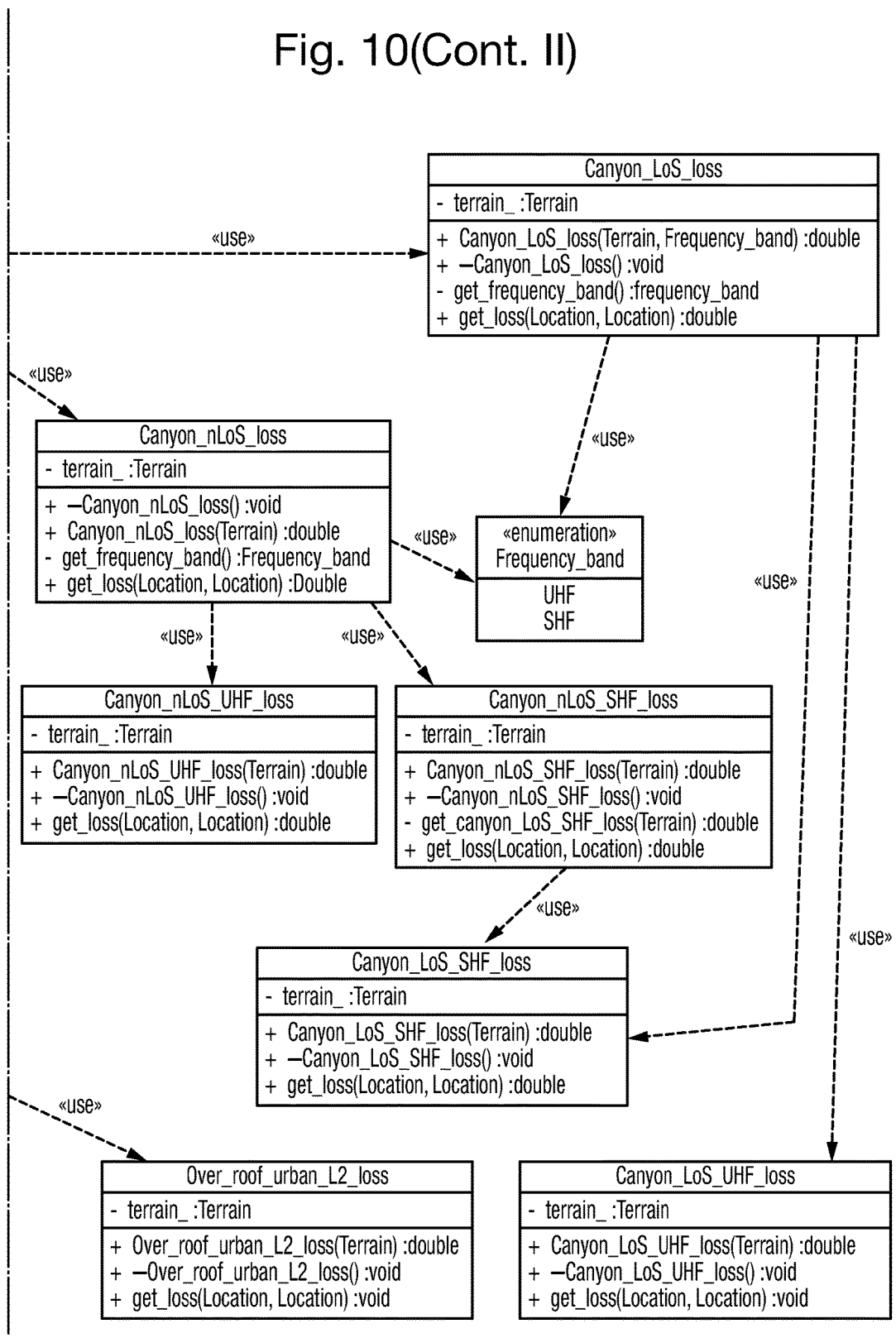

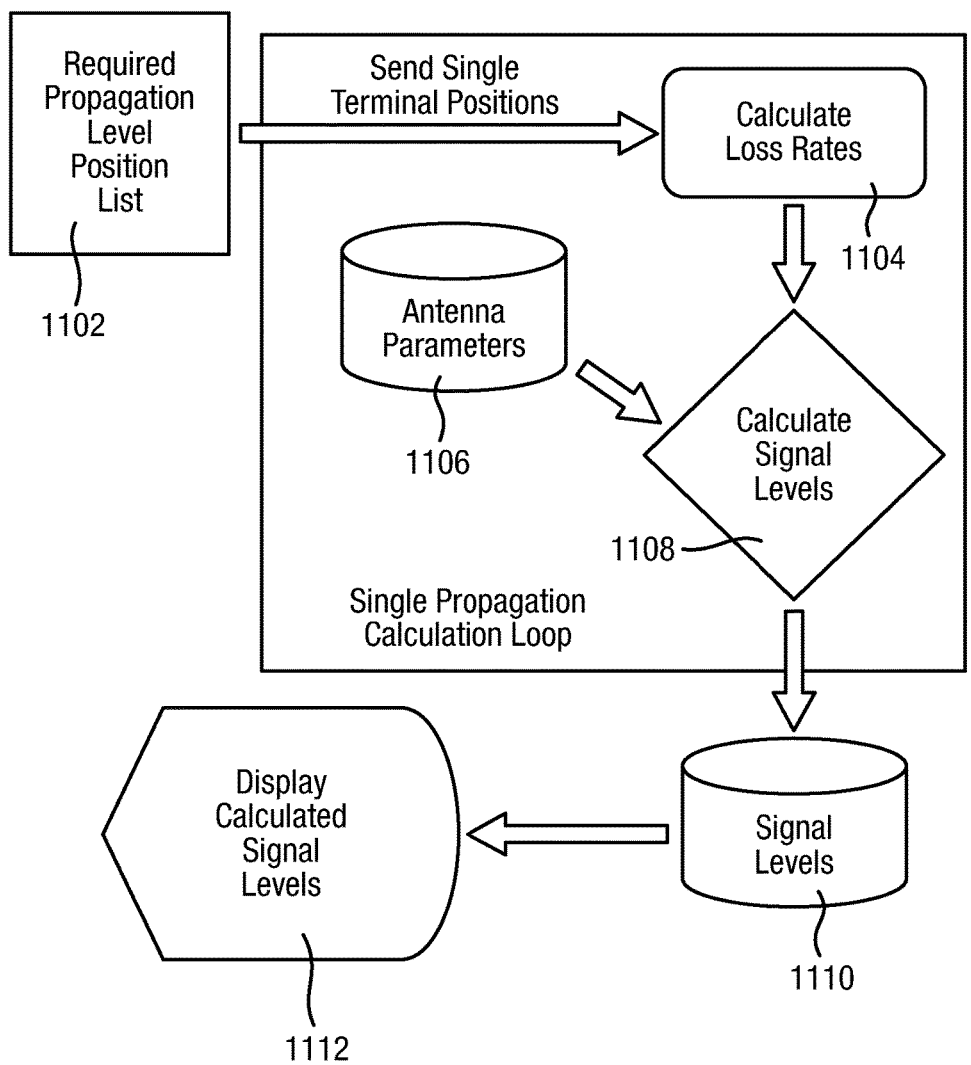

EVALUATING NEAR RANGE COMMUNICATIONS QUALITY

RELATED APPLICATIONS

This application is a national phase application filed under 35 USC § 371 of PCT Application No. PCT/GB2016/051935 with an International filing date of Jun. 28, 2016 which claims priority of GB Patent Application 1512923.2 filed Jul. 22, 2015 and EP Patent Application 15275176.4 filed Jul. 22, 2015. Each of these applications is herein incorporated by reference in its entirety for all purposes.

FIELD OF THE INVENTION

The present invention relates to near range communications.

BACKGROUND OF THE INVENTION

It is desirable to predict near range communications quality for various reasons. For example, it is useful to model the range of publically available Wifi™ hot spots and telecommunications transmitters. Also, it can be important to assess the signal strengths and viability of communications within cluttered urban environments, e.g. to aid frequency/channel assignment for public service (Health Services, Police, Fire brigade) communications and local citizen band radio (taxi firms, etc). Such prediction can be particularly difficult in cluttered and complex (for example, urban) environments where a large number and variety of objects and conditions, such as traffic levels, can affect communications quality.

Known techniques for accurate communications propagation modelling include ray tracing, which is time consuming and computationally expensive. Other techniques, such as purely diffraction-based methods, are faster but do not have the same level of accuracy and do not take into account detailed features such as traffic levels, etc.

A large number of existing proprietary and open source models/maps of environments are available. However, no known single data source is available in a readily-useable format that contains all the various types of information that can provide accurate propagation modelling.

SUMMARY OF THE INVENTION

Embodiments of the present invention are intended to address at least some of the above technical problems.

Embodiments of the invention disclosed herein can provide accurate and fast communications propagation calculations based on detailed features of an environment. Embodiments can be more detailed in some respects than known ray tracing methods, by taking into account other factors that cannot be included in the ray-tracing methods, such as road traffic levels. Embodiments can also be much less computationally intensive, allowing for near real-time use. Embodiments can use statistical measurement based equations similar to those used in known diffraction based approaches, but with a much higher fidelity and variability to calculate loss rates and propagation signal strengths.

Embodiments can extract data from a variety of different existing data sources/formats and combine relevant information into a single unique streamlined format/database. By doing this, the data format, size and complexity of computations can be greatly reduced, allowing much faster propagation calculations.

Embodiments can provide an end-to-end urban communication propagation tool/service that allows data from multiple sources and formats to be used and combined in order to provide accurate communications propagation estimates within cluttered urban environments. Embodiments can also configure devices based on the results of the computations.

According to one aspect of the present invention there is provided a method of evaluating near range communications quality in an environment, the method comprising:

obtaining data describing an environment from at least one data source;

processing the data describing the environment to generate a ground-plane data set describing a ground-plane of the environment, and a 3D object data set describing 3D objects in the environment;

using the ground-plane data set and the 3D object data set to compute a propagation path between a first location and a second location in the environment, and computing a near range communications quality characteristic of the propagation path.

The near range communications quality characteristic may comprise loss rate.

The first location may be associated with a first communications device, e.g. a transmitter. The second location may be associated with a second communications device, e.g. a receiver.

The method may further include:

receiving information regarding at least one communications characteristic of the first communications device;

receiving information regarding at least one communications characteristic of the second communications device;

processing the communications characteristic information and the computed loss rate to calculate a signal level of at least one of the first and the second communications devices.

The computing of the propagation path may comprise:

determining which said objects in the 3D object data set intersect a line of sight path between the first location and the second location.

The computing of the propagation path may further comprise:

determining a type/geometry of the propagation.

The propagation type/geometry may be determined from a set including: over roof, below roof and street canyon propagation, and/or high-rise urban, urban, sub-urban and rural.

The method may include using the determined propagation type/geometry to obtain at a set of parameters (e.g. building width, street width and orientation relative to the propagation path, or shorted street canyon path) relating to the objects for processing in a propagation path calculation algorithm.

The determining of the propagation type/geometry can use image processing, path-finding and/or least error fitting algorithms to obtain the at least one parameter.

The step of analysing the data describing the environment may comprise:

extracting data relating to a ground-plane and/or boundary corner locations of the environment (such as road, water bodies, city object foot points) from the data describing the environment to generate the ground-plane data set;

extracting data relating to object boundary position locations and/or object corner border locations of said 3D objects (such as buildings and city furniture) in the environment from the data describing the environment to generate the 3D object data set.

The step of analysing the data describing the environment may comprise:
reading at least some of the data items of the data describing the environment and categorising the data items (e.g. as ground-plane data items or 3D object data items), and the method may further comprise:
storing the data items in the ground-plane data set or the 3D object data set based on the categorisation.

The ground-plane data set and the 3D object data set may be stored as layers (having a same/single format) in a structured database.

The step of analysing the data describing the environment may comprise:
identifying data items in the data describing the environment useable for the computation of the propagation path.

The step of analysing the data describing the environment may comprise:
identifying duplicated data items of the data describing the environment, and
selecting only one said duplicated data item for storage in the structured database.

The method may further comprise generating additional data sets (based on the at least one data source and/or the ground-plane data set and/or the 3D object data set) for use in the computing of the propagation path. The additional data sets may include terrain information and/or situational data, such as traffic levels.

The method may comprise computing road data, waterway data and/or vegetation boundary location data based on the ground-plane data. The road data may be estimated using information regarding locations of the objects, such as buildings. The estimating may be achieved using image processing, morphological and/or line simplification algorithms. The waterway data may be determined based on rivers being near constant separations between sets the objects and being broader than roads. Regions that are neither road nor waterways can be designated as vegetation.

Steps of the method may be repeated for multiple said locations in order to generate data representing a signal level map. For instance, a propagation profile can be generated for a said transmitter location by calculating multiple propagation paths to multiple said receiver locations.

The computed near range communications quality characteristic may be used to automatically reconfigure a (local or remote) device.

According to another aspect of the present invention there is provided a system configured to evaluate near range communications quality in an environment, the system comprising:
a processor configured to obtain data describing an environment from at least one data source;
a processor configured to process the data describing the environment to generate a ground-plane data set describing a ground-plane of the environment, and a 3D object data set describing 3D objects in the environment;
a processor configured to use the ground-plane data set and the 3D object data set to compute a propagation path between a first location and a second location in the environment, and
a processor configured to compute a near range communications quality characteristic of the propagation path.

A method of generating data comprising:
obtaining data describing an environment from at least one data source;
processing the data describing the environment to generate a ground-plane data set describing a ground-plane of the environment, and a 3D object data set describing 3D objects in the environment.

A method of evaluating near range communications quality in an environment, the method comprising:
obtaining a ground-plane data set describing a ground-plane of the environment, and a 3D object data set describing 3D objects in the environment;
using the ground-plane data set and the 3D object data set to compute a propagation path between a first location and a second location in the environment, and
computing a near range communications quality characteristic of the propagation path.

According to another aspect, the present invention provides apparatus, e.g. a communications device, including a processor configured to operate methods substantially as described herein.

According to further aspects of the present invention there are provided computer-readable storage medium including instructions that, when executed on a processor, causes the processor to perform methods substantially as described herein.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 11 illustrates steps involved in a received signal level calculation process of the method.

DETAILED DESCRIPTION

Figure 1:
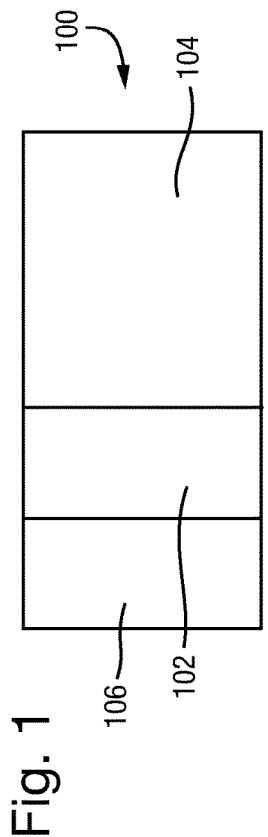
FIG. 1 schematically shows a computer device that can be configured to execute embodiments of the communications quality evaluation methods described herein.

Referring to FIG. 1, an example computing device 100 is shown. The device includes a processor 102, memory 104 and communications interface 106. The device may comprise a conventional computing device, such as a laptop computer, desktop computer, server, mobile devices including smartphones, radio communications devices, etc, and well-known features are not shown and need not be described in detail herein. However, the device can further include conventional components, such as a user input means (e.g. keyboard, touchscreen), display, etc. The device can be capable of communicating with remote devices via the interface 106 using any suitable wired or wireless technology over communications networks, including the internet.

Figure 2:
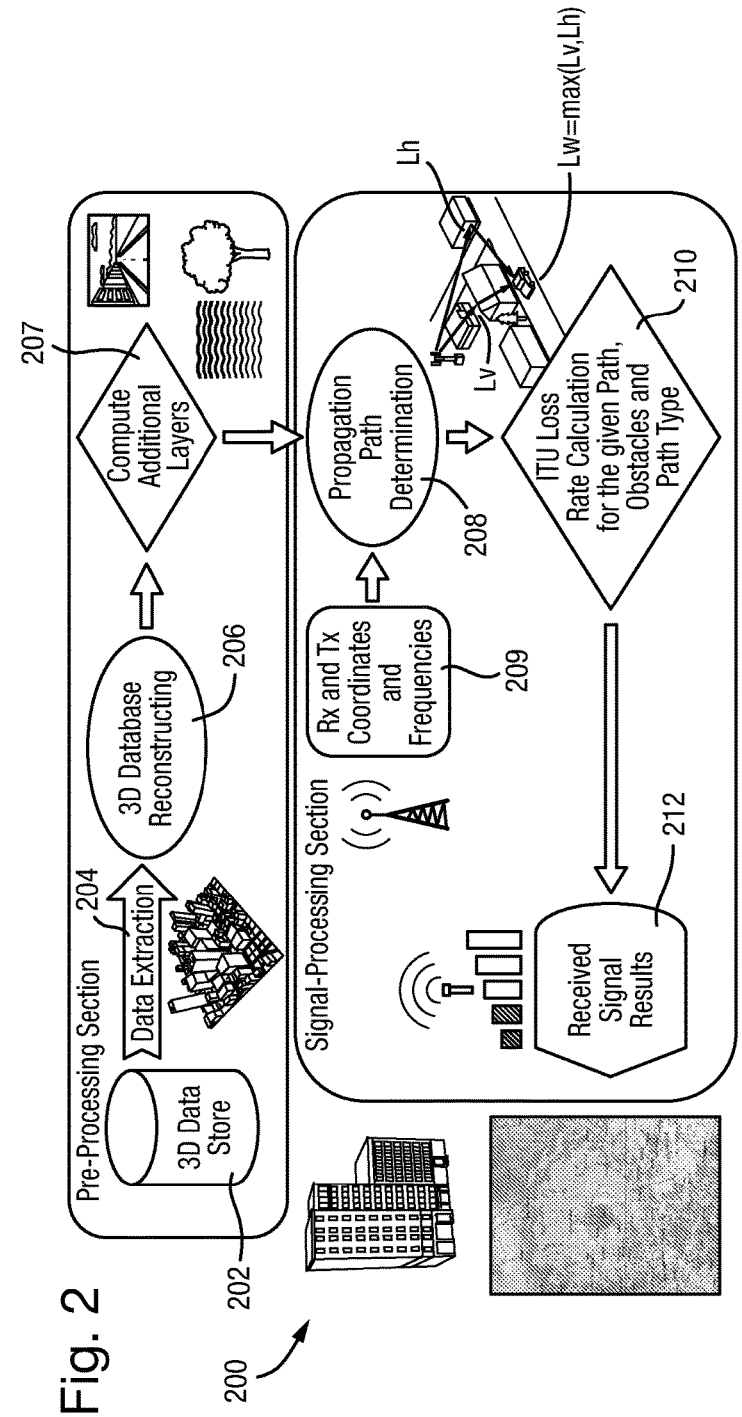
FIG. 2 is an end-to-end overview of an embodiment of the communications quality evaluation method.

FIG. 2 is an overview of an example communications quality evaluation method 200. The method may be at least partially implemented by means of code executing on a computer device, such as the device 100 of FIG. 1. It will be appreciated that the flowcharts/diagrams shown herein are exemplary only and at least some of the illustrated steps may be re-ordered or omitted. Also, additional steps may be performed. Further, although steps are shown as being performed in sequence, some could be executed concurrently in alternative embodiments. The steps may be performed by the same, or different, processors/devices. The skilled person will also appreciate that the methods described herein can be implemented using any suitable programming language/means and data structures.

Embodiments of the method 200 can provide an end-to-end communication propagation evaluation tool/service that allows data from multiple sources and formats to be used and combined to provide highly accurate communications propagation estimates within a cluttered environment, such as an urban environment that comprises many closely-clustered buildings/objects of varying dimensions. The predictions can be based on signal levels, data rates and availability using a variety of detailed 3D model data sets as inputs.

The method shown in FIG. 2 can be implemented as a software tool that is a modular in nature. This means that additional fidelity can be easily added in future as it develops, and a large variety of different data sets can be input to it, allowing it to run under multiple scenarios. In the example embodiment of FIG. 2, these modules are split into two main sections: "pre-processing" and "signal-processing".

The pre-processing section (items 202, 204, 206, 207) focusses on the computationally intensive tasks of exacting data from the available 3D data stores, computing any additional data layers necessary and reconstructing the all the data together into a streamlined data format. This section can be completed prior to live use of the tool if desired, which can greatly speed up live running times. The generated data may be transferred, as a whole, in part or on demand, to another device for processing.

The signal-processing section (items 208, 209, 210, 212) uses the streamlined 3D data created in the pre-processing section to evaluate communications quality, e.g. by producing signal strength estimates. This section is normally less computationally intensive and so can be run live by a user of the software tool. In some embodiments, at least the signal processing section of the method 200 may be performed by a processor included in, or in communication with, a communication device. In some embodiments, the result of the communications quality evaluation may be used to automatically reconfigure a (local or remote) device, e.g. electromechanically adjust an antenna or other component of a radio terminal; move a communications device (or controlling an autonomous vehicle housing the communications device, for example) to an alternative location that has been computed to offer improved communications quality; electronically adjust software-based settings of a device to improve communications quality, or automatically adjust parameters of other software based on the output (such as lowering the resolution of transmitted or received video streams if the signal strength is low).

The method 200 processes data based on at least one 3D data store 202 and process 204 extracts selected data from the store to generate a combined, restructured database 206.

Any additional information missing from the extracted data can be computed by process 207 and also stored in the database 206.

Once the environment database 206 is built, the method can use it to efficiently calculate the propagation paths and local path components of the communications. In propagation path determination process 208 the required information from the model is passed to propagation path algorithms, along with information 209 regarding the transmitter and receiver device (such as their locations and frequencies) and then in process 210 propagation loss rates and, optionally, powers for the paths can be calculated. In (optional) process 212 the results can be stored or processed in various ways, e.g. displayed to a local or remote user. Also, the calculations may be run for multiple locations in order to produce a propagation map.

Figure 3:
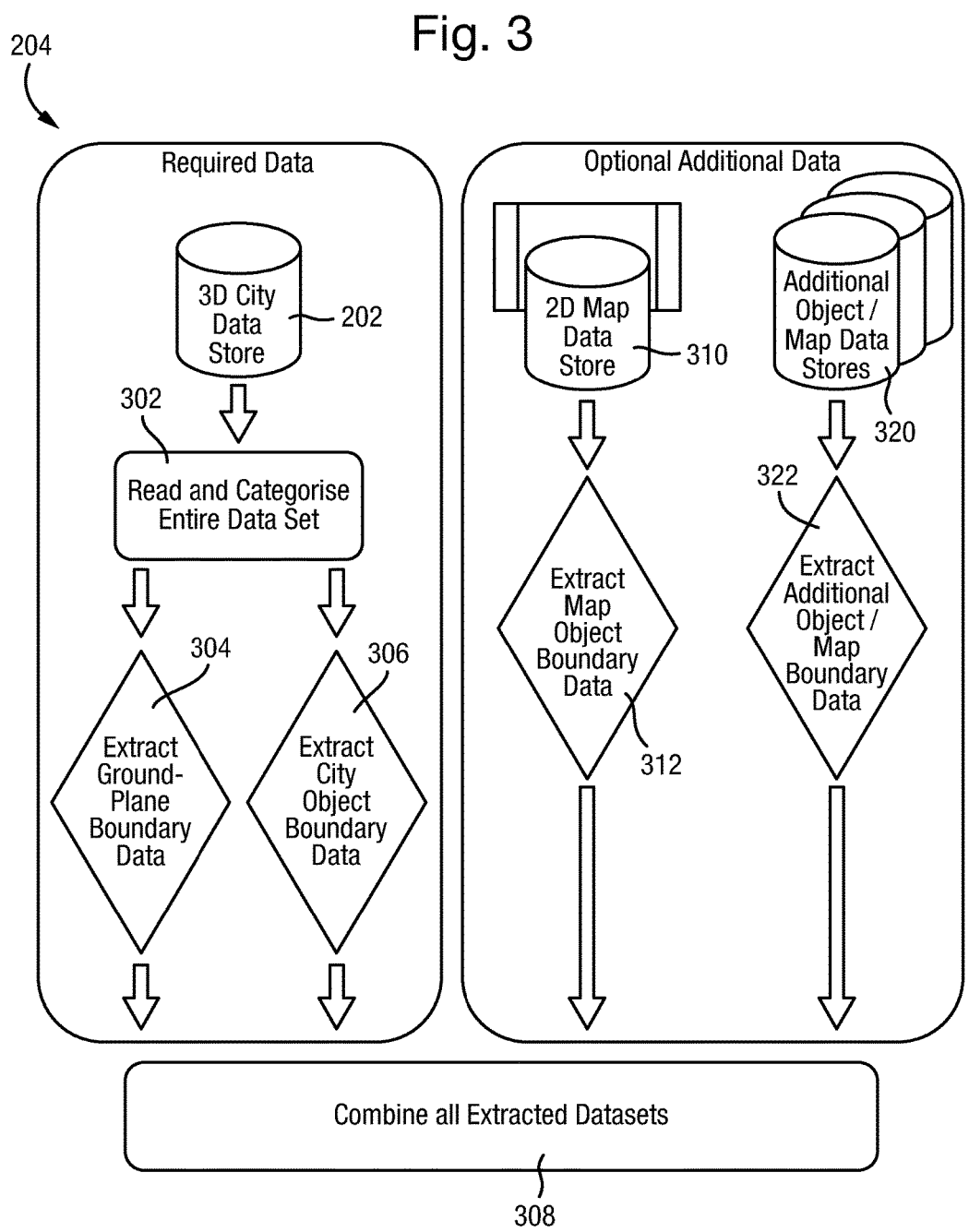
FIG. 3 illustrates example steps involved in a database generation process of the method.

FIG. 3 schematically illustrates examples of the data extraction process 204 of the method 200. The data extraction process can extract and combine data from at least one source and can deal with different data formats and types. One embodiment uses the known open source CityGML datasets, but it will be appreciated that any suitable data source(s) can be used. In order to operate, the method typically requires at least one file of 3D city/terrain data. From this, ground-plane, boundary corner locations and object 3D corner border locations can be extracted (shown at the left-hand side of the Figure). For instance, in the case of CityGML data source, ground-plane and building boundary location positions will be extracted. Different data sources may include other terrain objects, such as roads, waterways and land boundaries, which can also be used by embodiments of the method.

Common alternative/additional datasets can include 2D map data, such as those available from Open Street Maps, Ordinance Survey™ or Google Maps™. In these cases, the boundary position locations of objects within the maps (such as roads, land boundaries, rivers, lakes, etc) can be extracted. This extracted map data may then be combined with the extracted city data ground-plane from the other source(s) in order to produce accurate map features in the combined 3D database.

In the illustrated example data extraction process 204 of FIG. 3, 3D data from store 202 is processed at step 302. This can involve reading data labels/values in the source data and categorising them (typically in a temporary data storage structure) for subsequent storage in a structured/formatted manner in the reconstructed database 206. In typical embodiments, only object boundary positions and other required propagation data, such as their type and material metadata (where available), would be stored in the reconstructed database. Additional information that is superfluous for the method (such as the visual image/texture of the objects in CityGML) would not be extracted, thereby streamlining the content. Data that is present in two data formats in the source would be concatenated so that the highest resolution source was preferred over a lower resolution data source. Any additional data from the lower resolution source (such as object material information) would be kept if it were not included in the higher resolution data source. This would remove any duplication of data objects, such as buildings, in the reconstructed data. By dealing with a single common database, the input/output requirements for running calculations is greatly decreased, and any duplication removed/reduced.

This processing can be done for all or some of the source data, e.g. the process may select a particular subset of the environment source data based on geographical area/location and/or types of features/objects. The database 206 can be stored in any suitable volatile or non-volatile storage medium for use by the same computer device that generated it, to by another device. The database may also be edited and/or updated as necessary.

At step 304 data that was categorised as ground-plane boundary data at step 302 is extracted for storage in the restructured database 206. At step 306 data that was categorised as 3D city object boundary data at step 302 is extracted for storage in the restructured database 206. At step 308, all the extracted data are combined and stored in the combined 3D database 206.

The right-hand side of FIG. 3 also shows optional steps that can be involved in the data extraction process 204. For example, data from a 2D map data store 310 may be processed at step 312 so as to extract map object boundary data. The content/type of this data may already be known and so a categorisation step is not necessary. Additionally or alternatively, data from additional object/map data store(s) 320 can be processed at step 322 so as to extract selected additional object/map boundary data. The data extracted by any such steps can also be combined into the database 206 at step 308.

Figure 4:
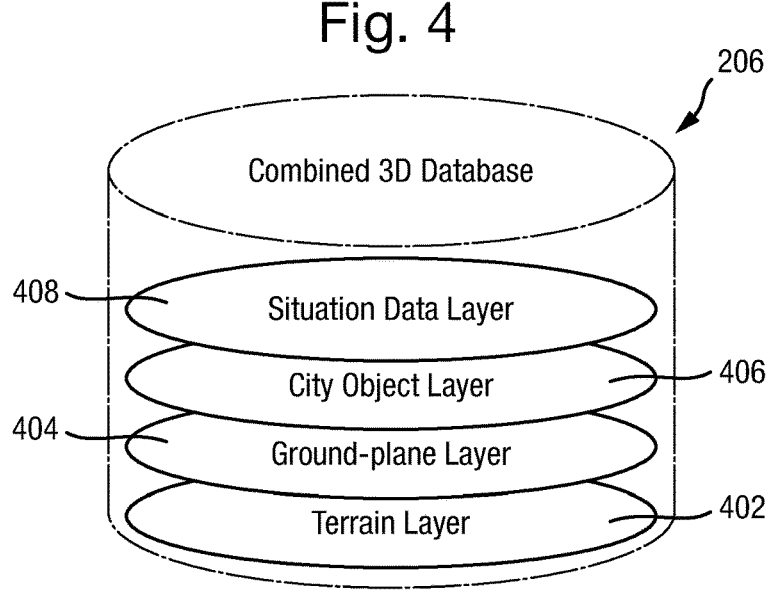
FIG. 4 schematically illustrates a generated database.

FIG. 4 schematically illustrates the structure of the contents of an example combined 3D database 206 produced by process 204. The example database comprises data arranged as a plurality of layers, but it will be understood that the data can be stored/processed using any suitable format/arrangement. All of the different extracted datasets are normally saved as separate layers within the final 3D reconstructed database in the same format. Typically, when the full 3D database is constructed, all of the individual layers are plotted together in the order:

1. Terrain information 402 (such as the terrain deformation, i.e. how the ground-plane varies due to the underlying uneven terrain, if available),
2. Ground-plane data 404 (such as road, water bodies, city object foot points),
3. City/map 3D objects data 406 (such as buildings and city furniture),
4. Situational Data 408 (such as traffic levels, etc, if available)

Normally, only the ground-plane and city object data is required for the method 200 to operate. However, the more detailed information that is included in the database, the more accurate the propagation predictions. Having data in the database 206 in the structured format/arrangement makes accessing desired data quicker, thereby speeding up computations that use the data.

A variety of optional additional data formats can be processed and their relevant data combined with the minimum data. The aim of adding such additional data is to include information that is either incomplete or missing from the primary data set(s) 202. The compute additional layers process 207 of the method 200 can work by first determining which layers have been added to the combined 3D database from all of specified separate input datasets. If required ground-plane data is missing, such as road and vegetation boundary locations, then these can be computed from the city object ground-plane data. As the produced layers are estimated/computed from other data, they may not accurately reflect the actual position of roads, vegetation and water bodies. It is therefore preferable to input this data where available.

Figure 5:
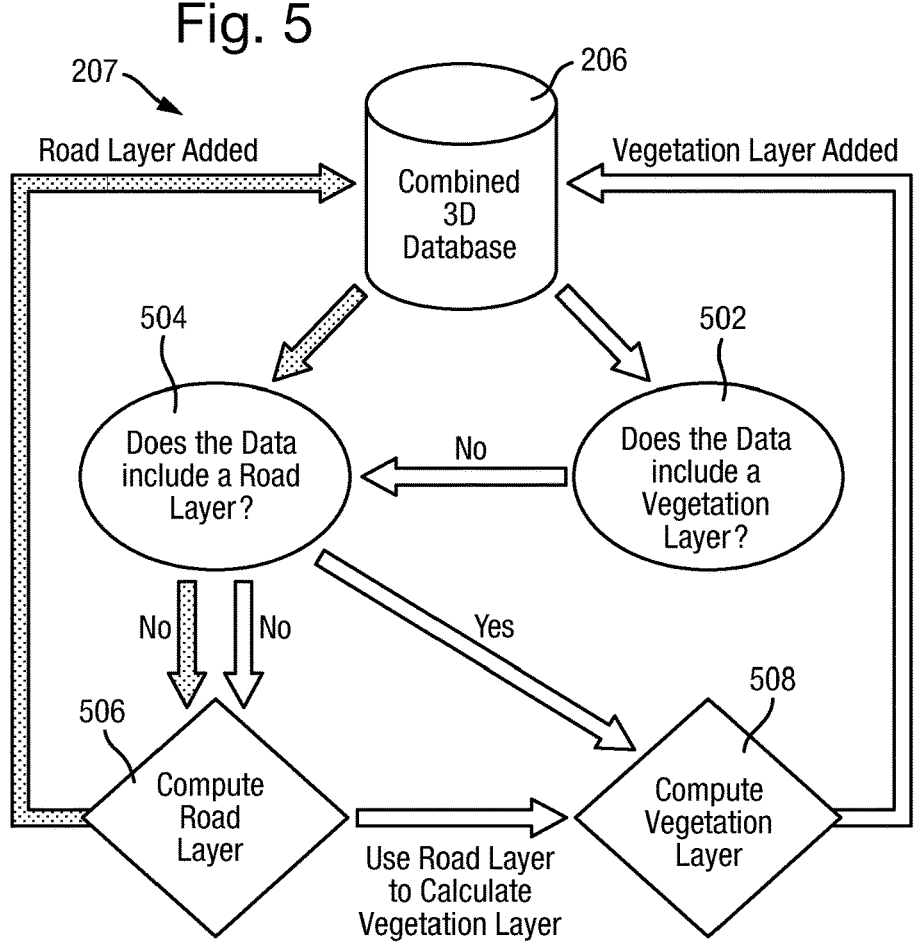
FIG. 5 illustrates example steps involved in an additional layer generation process of the method.

An example of how missing ground-plane data layers can be computed is shown in FIG. 5. After loading at least part of the combined 3D database 206, the process 207 checks at step 502 whether the database includes a vegetation layer. If it does not then control passes to step 504, where a check is performed as to whether road layer data is included in the database. If not then control passes to step 506, where road layer data is estimated using the locations of city objects, such as buildings, in the database. This estimation may be achieved by using a range of image processing, morphological and line simplification algorithms, such as those disclosed, for example, in: David Douglas & Thomas Peucker, "Algorithms for the reduction of the number of points required to represent a digitized line or its caricature", The Canadian Cartographer 10(2), 112-122 (1973) doi:10.3138/FM57-6770-U75U-7727; Gonzalez, R. C., R. E. Woods, and S. L. Eddins, Digital Image Processing Using MATLAB, Gatesmark Publishing, 2009; Haralick, Robert M., and Linda G. Shapiro, Computer and Robot Vision, Vol. I, Addison-Wesley, 1992, pp. 158-205, and Van den Boomgard, R, and R. van Balen, "Methods for Fast Morphological Image Transforms Using Bitmapped Images," Computer Vision, Graphics, and Image Processing: Graphical Models and Image Processing, Vol. 54, Number 3, pp. 254-258, May 1992.

Bodies of water, such as rivers, are found as near constant separations between sets of city objects that are too broad to be roadways. Regions that are neither road nor waterways can be designated as vegetation at step 508. The database 206 can then be updated with the computed additional data, which can be added to the appropriate layers within the database structure.

Figure 6A:
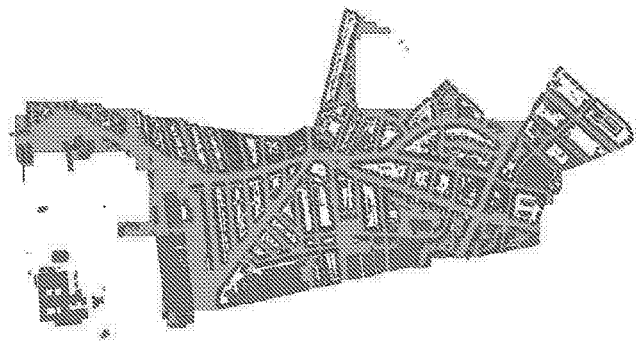
FIGS. 6A-6C illustrate example data layers processed by the method.
Figure 6B:
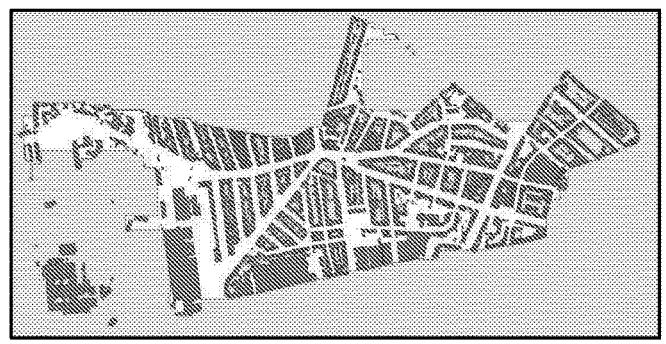
Figure 6C:
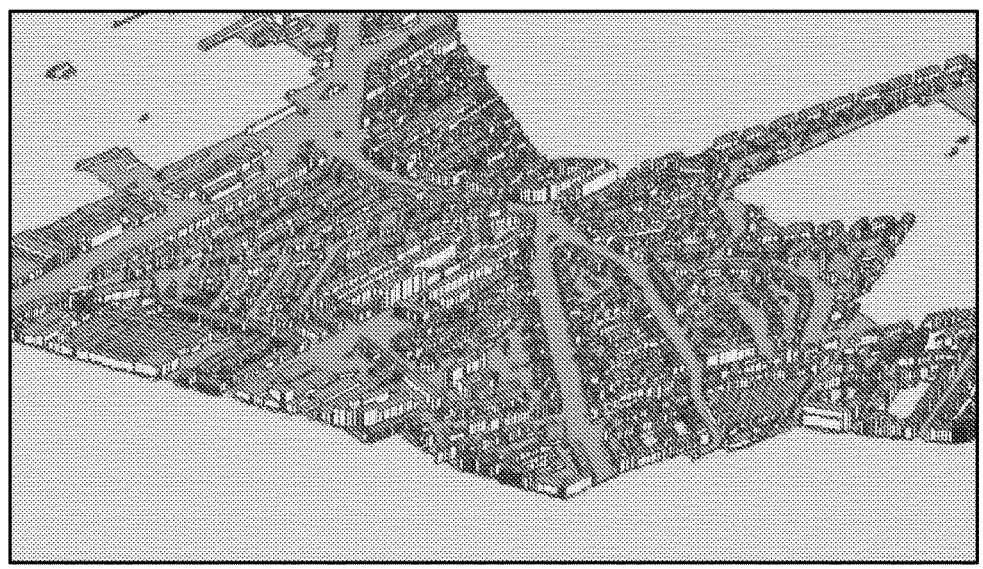

Embodiments of the method can provide further additional detailed layers to add even greater fidelity to the models. These can include layers, such as water and different road categories (e.g. highway/motorway, A or B road, etc), see the examples of FIGS. 6A and 6B. The results of the combining of the exported 3D building data and the additional computed layers in a custom streamlined database format can be seen in FIG. 6C. Once this is done, the positions of the antennas and the propagation path in the environment can be determined.

Figure 7:
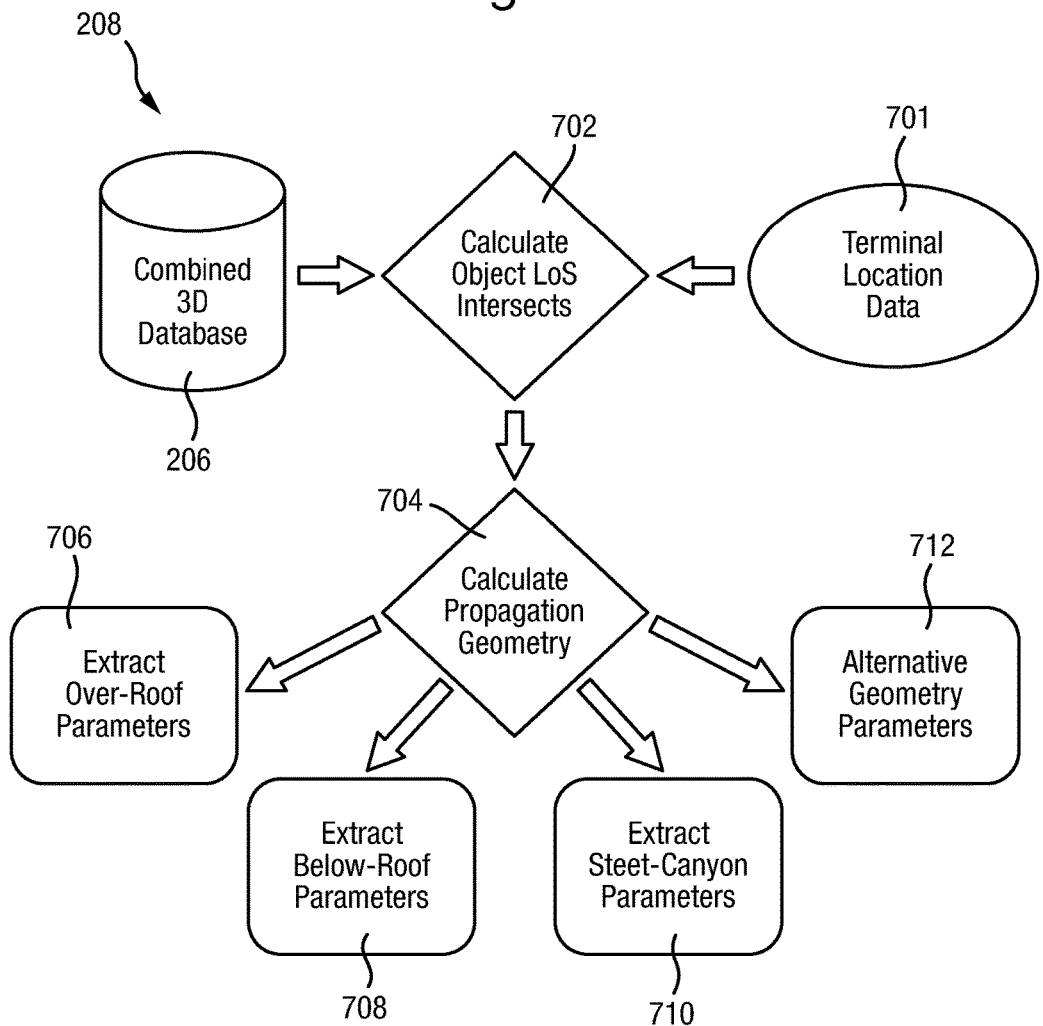
FIG. 7 illustrates example steps involved in a propagation path determination process of the method.

FIG. 7 shows examples of steps involved in the propagation path determination process 208. This process can determine which objects intersect the direct line of sight (LoS) path between two communications devices, such as transmitter and receiver radio terminals. The process can read data from the reconstructed 3D database 206, as well as data 701 relating to characteristics of the communications devices, typically including at least their locations within the environment. At step 702, the process calculates the number and locations of intersect points between all object types in the reconstructed 3D database 206 and the line of sight path between the two terminals, e.g. by analysing the coordinates of the objects and terminals.

At step 704, the propagation path determination process can determine the type/geometry of the propagation. Embodiments of the process can determine whether the propagation is over roof, below roof, street canyon propagation, or any other type of propagation (e.g. free space) through an environment. In example embodiments, if no objects are found to intersect the LoS path then the propagation type is classed as LoS. Otherwise, if the antenna height is above the maximum object height, to a height lower than the maximum object height, then it can be classed as "over-roof". If the propagation is from below the maximum object height, and definitely if below the average building height, then it can be classed as "below-roof" propagation. If both antennas are below the average street height (e.g. height of road vehicles ~3 m), then it can be classed as "street canyon" propagation. In alternative embodiments, different propagation geometry classifications can be used, e.g. high-rise urban, urban, sub-urban and rural.

Once the geometry type has been determined, the appropriate object parameters are extracted for the appropriate propagation path calculation algorithms. The propagation type/geometry categories may then be subdivided due to other propagation details, such as environment type (e.g. high rise urban, urban, suburban etc.), frequency range (e.g. VHF, SHF or UHF), etc. Once the correct subdivision is found then the required propagation parameters for the propagation path calculation algorithm to be used can be extracted from the 3D model (e.g. building width, street width and orientation relative to the propagation path, or shorted street canyon path). The propagation path determination process 208 can use a large variety of image processing, path-finding, and least error fitting algorithms to determine the required parameters.

At step 706, the example process extracts parameters for any propagations determined at step 704 to be over-roof propagation. The parameters to be extracted for over-roof propagation can be found in ITU-R, Recommendation ITU-R. P. "1411-7: Propagation data and prediction methods for the planning of short-range outdoor radio communication systems and radio local area networks in the frequency range 300 MHz to 100 GHz" ITU-R Rec (2013). Examples of alternative propagation data and prediction methods that can be used in alternative embodiments include: Recommendation ITU-R P.530-9, Propagation Data and Prediction Methods Required for the Design of Terrestrial Line-of-sight Systems, Study Group 3, Radiowave Propagation, Geneva 2001; ITU-R Recommendation P.838-1. Specific Attenuation Model For Rain For Use In Prediction Methods, Study Group 3, Radiowave Propagation, Geneva, 1999; ITU-R Recommendation P.618-7. Propagation Data and Prediction Methods Required for the Design of Earth-Space Telecommunication Systems, Study Group 3, Radiowave Propagation, Geneva, 2001; ITU-R Recommendation P.676-5. Attenuation by Atmospheric Gases, Study Group 3, Radiowave Propagation, Geneva, 2001; ITU-R Recommendation P.837-3. Characteristics of Precipitation for Propagation Modelling, Study Group 3, Radiowave Propagation, 2001; ITU-R Recommendation P.1144-2. Guide to the Application of the Propagation Methods of Radiocommunication Study Group 3, Study Group 3 Radiowave Propagation, 2001; IEEE Transactions on Communications, Vol. COM 28, No 9, Prediction of Attenuation by Rain, Crane, Robert, K., 1980, and Radio Science, Vol 17, Number 6, P 1371-1378, A Two-component Rain Model for the Prediction of Attenuation Statistics, Crane, Robert, K., 1982.

The parameters can be determined by analysing the objects found to intersect the LoS path between the two terminals. The propagation algorithms may conform to those outlined by the ITU-R, and are valid between 300 MHz and 100 GHz for different cases. The algorithms can be updated when new/more accurate algorithms are released or discovered, or if additional niche propagation methods are required. Embodiments of the method implemented in a modular nature can allow a combination of the algorithms to be implemented for a single propagation calculation, if required.

Figure 8:
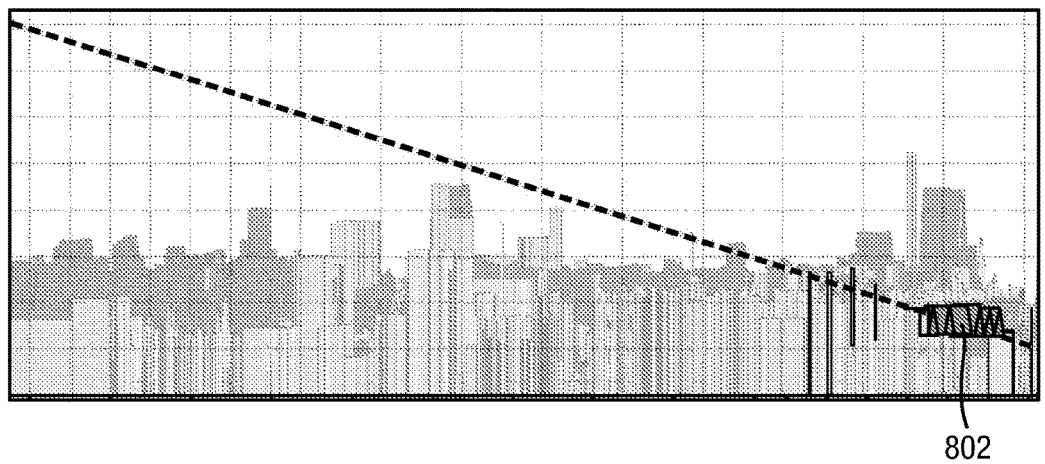
FIG. 8 is a graph illustrating an example of propagation path prediction.

An example of an over-roof propagation path analysis is shown in the graph of FIG. 8, where the obstructing obstacles to the line of sight path are in the foreground and labelled 802. From this, the relevant street and building parameters can be extracted by analysis of the relevant coordinates.

At step 708, the example process extracts parameters for any propagations determined at step 704 to be below-roof propagation. The parameters to be extracted for below-roof propagation can also be found in the ITU-R Recommendation cited above. Again, these parameters can be determined by analysing the objects found to intersect the LoS path between the two terminals.

At step 710, the example process extracts parameters for any propagations determined at step 704 to be propagation through street canyons. For this, the shortest and all other possible paths between the two transmitters usually needs to be calculated. Image processing may be used to determine the position of all the corner and branch locations in the road layer. With these positions, an implementation of, for example, Dijkstra's Algorithm (Knuth, D. E. (1977). "A Generalization of Dijkstra's Algorithm". Information Processing Letters 6 (1): 1-5. doi:10.1016/0020-0190(77) 90002-3) can then be used to determine the shortest path between the two terminals and order all the other possible routes between the terminals in terms of path distance. Each path can then be stored and turned into a connection of corner positions, distances, angles and straight line propagation paths to be entered to loss rate calculation algorithms (as disclosed in the 2013 ITU-R Recommendation cited above, for example).

Figure 9:
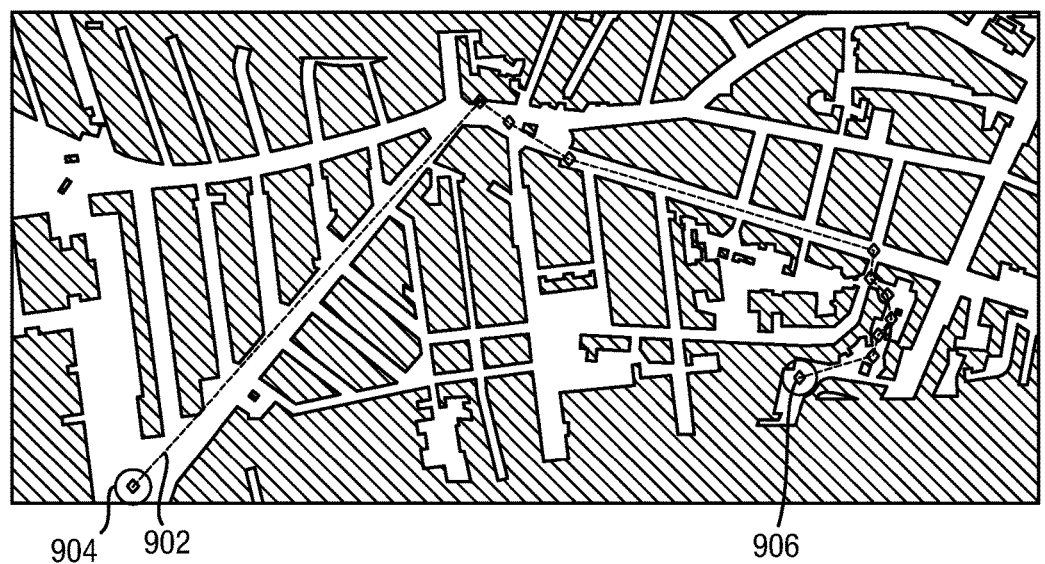
FIG. 9 illustrates an example of street canyon finding.

An example of the street canyon propagation determination algorithms is illustrated in FIG. 9, which shows the results of the shortest path finding algorithms for street level propagation. The shortest route determination is shown as a dotted line 902 between transmitting 904 and receiving 906 antennas via street canyon propagation.

At step 712 any additional information, such as traffic levels, can be extracted from the combined database 206 where available. Otherwise default values can be used. The architecture of embodiments of the tool may be left open so that additional/alternative geometries and algorithms can be added.

Figure 10:
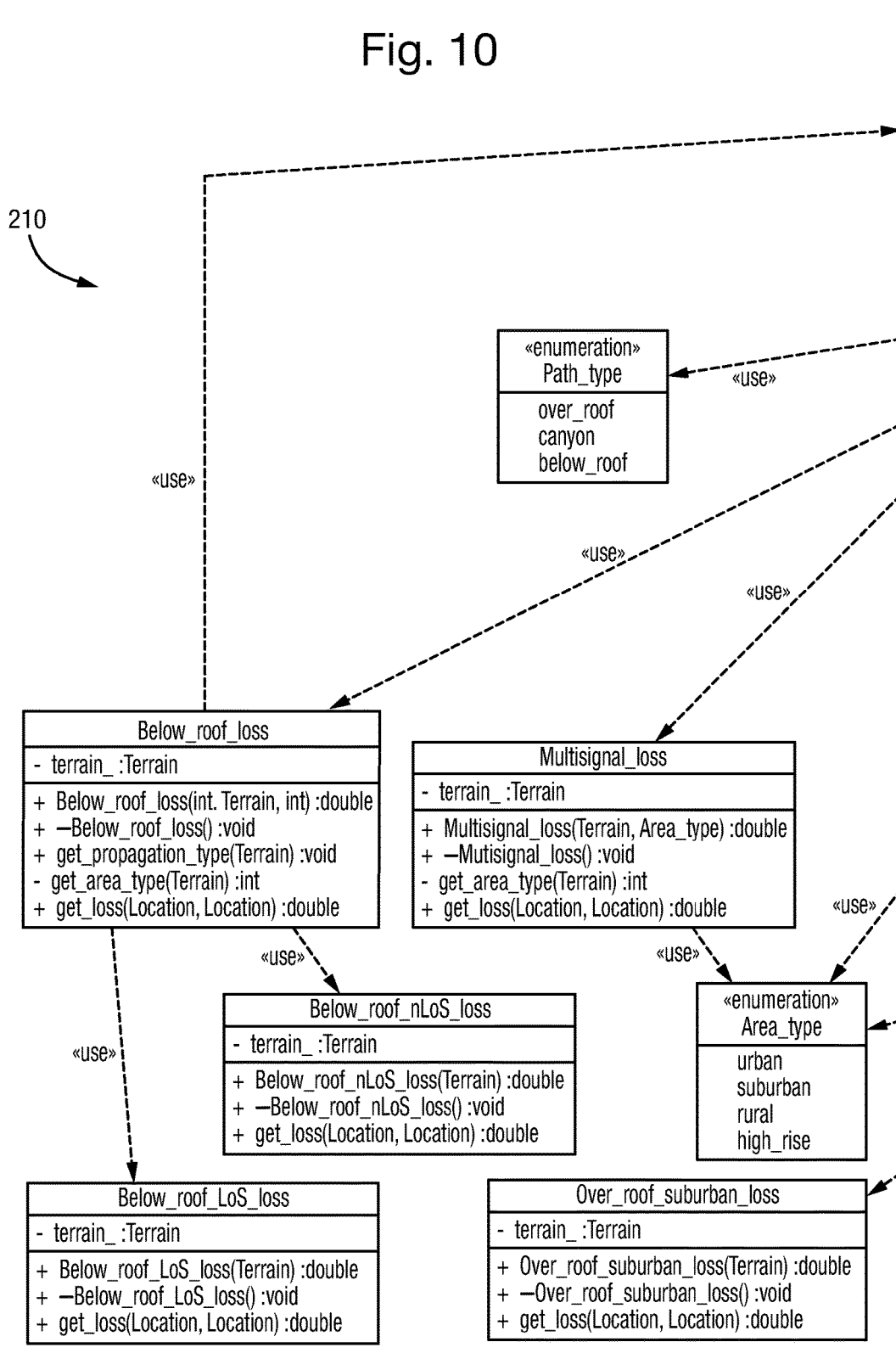
FIG. 10 shows a system model of an implementation of a loss rate calculation process of the method.

Once the propagation paths have been determined, the loss rate calculation process 210 can use algorithms (as disclosed in the ITU-R Recommendation cited above, for example) to calculate propagation path loss rates based on inputs that typically include the transmitter and receiver coordinates, as well as path and obstacles types. A system model of the implementation of the ITU algorithms is shown in FIG. 10. However, embodiments of the tool are designed to be open so that other/further algorithms can be used. In some embodiments, the output of the method can comprise the calculated loss rate between the two terminals (or two locations within the environment where, for example, it is planned to position communication devices, or personnel carrying them, based on generic/default communications device details).

FIG. 11 shows examples of steps involved in the received signals process 212, which calculates the signal levels expected at each of the terminals. These can be calculated using specific antenna parameters, such as radiative power with frequency, antenna profile, etc. At step 1102 a list of required propagation level positions is received and processed so that information regarding the position of each terminal in the list is sent to a loss rate calculation step 1104. The information passed to the loss rate calculation step includes all of the propagation parameters that are extracted at the propagation path determination process 208 (such as building width, etc), and information such as the antenna positions, area type and propagation type (e.g. below-roof" or "urban", etc) so that the calculation can be conducted.

At step 1104 the loss rates can be calculated using the loss rate calculation algorithms disclosed in the ITU-R Recommendation cited above, for example. Data 1106 representing parameters (e.g. radiative power with frequency, antenna profile, etc) of the transmitter and the receiver antennas is received and the calculated loss rates are used at inputs to step 1108, which calculates the signal levels. This can be done using the signal level calculation algorithms disclosed in the 2013 ITU-R Recommendation cited above, for example, but the skilled person will appreciate that other methods could be used, such as the alternative prediction methods cited above. The results can be stored in a signal levels data store 1110 for further processing/output. For example, at step 1112 a display showing the calculated signal levels may be generated.

To produce a signal strength map, the calculations for each position (or subset of positions) on the map can be calculated separately and stored, with the results then being displayed to the user. A propagation profile can be calculated for a given transmitter location by calculating multiple propagation paths to multiple surrounding receiver locations. Depending upon the user's requirements, this data can be presented in a variety of human/machine readable, graphical/visual, or even audio, ways by a module implementing the received signal results process 212. In some embodiments, loss rates and related output information for input transmitter and receiver coordinates may be presented textually as follows:

PathType 1
Propagation Type Non-LoS
areaType urban
TxPos 92075 739675.1 40
RxPos 93015 440010.3 5.2
roofHeight 13.3199
streetW 59.4683
avBSep 68.6176
bExtent 0.00018427
sOrientation 65.1407
Loss Rate in dB=127.04
Free Space Loss for distance in dB=99.9919

Results produced by embodiments of the method described herein compare well to those determined using existing diffraction based methods, suggesting at least first order approximation in accuracy.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of evaluating near range communications quality in an environment, the method comprising:
   obtaining 3D data describing an environment from a first data source;
   processing the 3D data describing the environment to generate a ground-plane data set describing a ground-plane of the environment, and a 3D object data set describing 3D objects in the environment, wherein processing the 3D data comprises selecting 3D data to extract from the first data source to generate the ground-plane data set and the 3D object data set;
   obtaining 2D data describing the environment from a second data source, and selecting 2D data from the second data source to combine with the ground-plane data set and/or the 3D object data set to improve the ground-plane data set and/or 3D object data set;
   using the ground-plane data set and the 3D object data set to compute a propagation path between a first location and a second location in the environment, and
   computing a near range communications quality characteristic of the propagation path.

2. The method according to claim 1, wherein the near range communications quality characteristic comprises a computed loss rate, the first location is associated with a first communications device, and the second location is associated with a second communications device.

3. The method according to claim 2, further comprising:
   obtaining information regarding at least one first communications characteristic of the first communications device;
   obtaining information regarding at least one second communications characteristic of the second communications device, and
   processing the information regarding the first and second communications characteristics and the computed loss rate to calculate a signal level of at least one of the first and the second communications devices.

4. The method according to claim 3, wherein steps of the method are repeated to generate a propagation profile for the first communications device by computing multiple said propagation paths to multiple receiver locations.

5. The method according to claim 1, wherein computing the propagation path comprises:
  determining which of said objects described by the 3D object data set intersect a line of sight path between the first location and the second location.

6. The method according to claim 5, wherein computing the propagation path further comprises:
  determining a type or geometry of the propagation path, and
  using the determined propagation type or geometry to obtain a set of parameters relating to the objects for use in a propagation path calculation algorithm.

7. The method of claim 6, wherein the set of parameters relating to the objects for use in a propagation path calculation algorithm includes at least one of:
  building width;
  street width and orientation relative to the propagation path; and
  shorted street canyon path.

8. The method according to claim 1, wherein analysing the data describing the environment comprises:
  extracting data relating to at least one of a ground-plane and boundary corner locations of the environment from the 3D data describing the environment to generate the ground-plane data set; and
  extracting data relating to at least one of object boundary position locations and object corner border locations of said 3D objects in the environment from the 3D data describing the environment to generate the 3D object data set.

9. The method according to claim 1, wherein the step of analysing the 3D data describing the environment comprises reading at least some data items of the data describing the environment and categorizing the data items, and the method further comprises storing the data items in the ground-plane data set or the 3D object data set based on their categorization.

10. The method according to claim 9, wherein the ground-plane data set and the 3D object data set are stored as layers having a same format in a structured database.

11. The method according to claim 10, wherein analysing the 3D data describing the environment further comprises:
  identifying a group of duplicated data items of the data describing the environment, and
  selecting only one of said group of duplicated data items for storage in the structured database.

12. The method according to claim 1, further comprising computing at least one of road data, waterway data, and vegetation boundary location data based on the ground-plane data set.

13. The method according to claim 1, further comprising using the computed near range communications quality characteristic to automatically reconfigure a local or remote device.

14. A system configured to evaluate near range communications quality in an environment, the system comprising:
  a processor configured to:
    obtain 3D data describing an environment from a first data source;
    process the 3D data describing the environment to generate a ground-plane data set describing a ground-plane of the environment, and a 3D object data set describing 3D objects in the environment, wherein the processor is configured to select 3D data to extract from the first data source to generate the ground-plane data set and the 3D object data set;
    obtain 2D data describing the environment from a second data source; and
    select 2D data from the second data source to combine with the ground-plane data set and/or the 3D object data set to improve the ground-plane data set and/or 3D object data set;
  a processor configured to use the ground-plane data set and the 3D object data set to compute a propagation path between a first location and a second location in the environment, and
  a processor configured to compute a near range communications quality characteristic of the propagation path.

* * * * *